Figure 1:
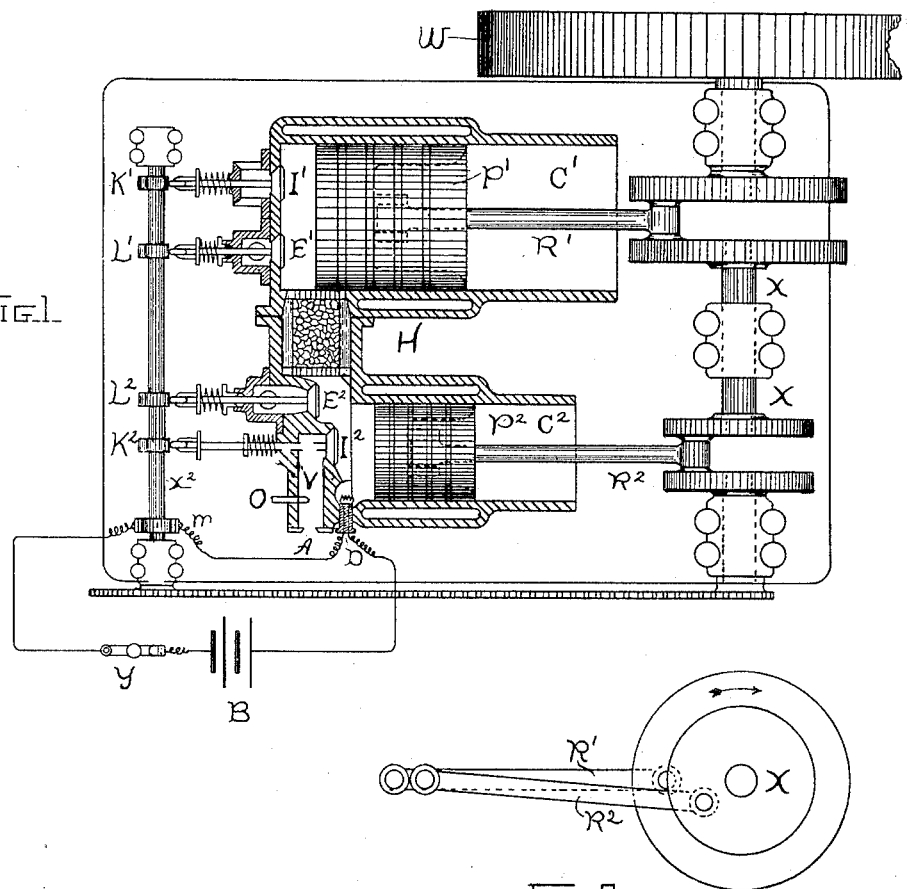

No. 642,176. Patented Jan. 30, 1900.
E. THOMSON.
INTERNAL COMBUSTION ENGINE.
(Application filed Feb. 23, 1898.)
(No Model.)

WITNESSES.
Henry O. Westendarp
Dugald McKillop.

INVENTOR
Elihu Thomson

UNITED STATES PATENT OFFICE.

ELIHU THOMSON, OF SWAMPSCOTT, MASSACHUSETTS.

INTERNAL-COMBUSTION ENGINE.

SPECIFICATION forming part of Letters Patent No. 642,176, dated January 30, 1900.

Application filed February 23, 1898. Serial No. 671,239. (No model.)

*To all whom it may concern:*

Be it known that I, ELIHU THOMSON, a citizen of the United States, residing in the town of Swampscott, county of Essex, and State of Massachusetts, have invented a new and useful Improvement in Internal-Combustion Engines, of which the following is a specification.

My invention relates to a novel type of internal-combustion engine suitable for the use of gas or oil vapor mixed with air at its fuel charge.

In my invention the fuel charge taken into the engine on the intake-stroke is preferably made so as to be almost (if not quite) nonexplosive on contact with hot surfaces—*i. e.*, the charge as a mass cannot burn, but is capable of being driven through a highly-heated mass of refractory substance containing fine apertures to be burned with a resulting great increase of temperature.

In my invention also at or about the same time that the charge or fuel mixture is drawn in a body of air is taken into the engine by a separate cylinder and remains unmixed with the fuel charge until near the conclusion of the compression-stroke, after which there is a commingling of the fuel charge driven through fine hot passages, the hot gas mixing with the compressed charge of air tending to expand the same, which expansion takes place on the further forward movement of the pistons following, which movement constitutes the power-stroke. Lastly, the waste gases are exhausted ready for the renewal of the active charges.

The cycle of operations may then be briefly described as follows: One cylinder is filled with air through an inlet-valve during the motion of the piston which increases the cylinder-space, and which is therefore the intake-stroke, at the same time that another cylinder (generally smaller) is filled with combustible gas or vapor, with air in such excess that the mixture is not easily exploded. It is preferred to make the relation of the cranks controlling the pistons of the two cylinders such that there is a decided lead of the air-drawing piston over the fuel-charge-drawing piston, in consequence of which the fuel charge at the conclusion of the compression-stroke may be readily transferred through a hot refractory material between the two cylinders and mixed with the air in the air-cylinder for heating and expanding the same. Third, the expansion due to heating forces the pistons forward, the air-cylinder piston leading the other through a certain angle of cranks. This is the power-stroke. Finally, the return of the pistons discharges the waste gases from both cylinders. I am enabled in employing this cycle of operations to secure smooth running without shock or explosion and to use a minimum of fuel for a large volume of gas.

My invention will be better understood by reference to the accompanying drawings.

Figure 2:
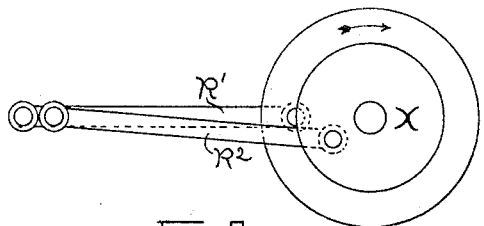

Figure 1 is a plan, partly in section, of an engine constructed in accordance with my invention and employing the cycle of my invention. Fig. 2 is a diagram of the crank relations preferred, though it is to be understood that the pistons might be synchronous—*i. e.*, their cranks may coincide as to position or be upon the same diameter.

I will first describe the structure of the engine and then point out its mode of operation, understanding that considerable departures may be made from the structure shown without affecting the invention in its substance.

W is a fly-wheel mounted upon the main shaft X X of the engine, which shaft has two cranks and connecting-rods to two pistons $P'$ and $P^2$, moving in cylinders $C'$ and $C^2$. Cylinder $C'$ may be of larger capacity than cylinder $C^2$ and the piston $P'$ may have considerable clearance from the bottom of the cylinder $C'$, while piston $P^2$ may be arranged to expel nearly all the contents of cylinder $C^2$ when down—*i. e.*, to have but little clearance. Between the two cylinders and in a space or passage provided therefor is a heater H, preferably constructed of refractory material, suitably held in place and having fine passages through it which connect the two cylinders. The heater H might consist of a block of fire-brick with fine passages molded therein, either tortuous or straight, or it may be a casing of fire-resisting material in an opening between $C'$ and $C^2$ and packed with particles of broken fire-brick or other granules of refractory material capable of standing a bright-red heat. To avoid loss, the heater H is thus surrounded by a layer of non-conducting substance which closely fits the metal supporting and containing it.

V is a passage or space into which combustible gas or oil is led, mixed with air, during every alternate forward stroke of piston P². An oil-vapor-supply tube O may be provided with an air-opening A, whereby on the opening of valve I² and motion forward of piston P² a mixture of gas with gas or oil vapor is drawn in. During normal operation this mixture is made so poor in combustible as not to easily be fired or exploded. Just before piston P² begins to draw its charge piston P' will have moved a little forward and will take in air through valve I', which is the air-inlet for cylinder C'. The pistons then move out together, with piston P' leading, on account of the relative position of the cranks, and the space back of piston P' fills with air at normal atmospheric pressure, the space back of P² with the mixture of air or oil vapor or gas. Valves I' and I² are now shut and the compression-stroke begins. This forces the charge of air into small compass back of piston P', and likewise the charge of combustible and air is compressed back of piston P²; but inasmuch as piston P² has but slight clearance, while piston P' has large clearance relatively, the charge, with combustible, will pass from cylinder C² to cylinder C' through the heater H, which heater H has by suitable methods been brought to a high temperature in its interior. This high temperature unites the oxygen of the air and combustible as the mixture passes the heater H, and the high-temperature gas so produced passes out into the compressed air back of piston P'. There results from this an increase of pressure during the transfer of the charge from cylinder C² to C' and its admixture with the comparatively cold charge of compressed air therein contained. Piston P' moves forward, followed by piston P² at a short interval, and the gases back of the pistons, expanded from their highly-heated and compressed state, cool considerably during the power-stroke or forward motion. On the completion of this stroke valves E' and E² are opened, and the return motion of the piston drives the gases back of both pistons outward or exhausts them, after which a new charge of air with combustible is taken in cylinder C² through valve I², as before, and a new charge of air without combustible through the cylinder C' through valve I'.

It is of course to be understood that any suitable mechanism may be employed for giving the proper sequence of openings and closings of the valves I' E' I² E², and this forms no substantial part of my present invention. Cam-shaft X², e. g., may have suitable cams K' K² L' L², controlling, respectively, the inlet and outlet valves or exhaust-valves, the placing of the cams and lifting of the valves being timed in accordance with well-known principles and the gearing of the cam-shaft X² being properly related, so as to give it the proper speed with relation to the main shaft X X. Also it will be understood that governing devices may be employed to cause the inlet and fuel charges to miss or fail to be taken in.

To start the engine, it is of course necessary that the heater H shall be brought to a high temperature. This might be done by electrical heating, or one of the ways may be described as follows: An increase of the amount of combustible fed through V with the air renders the mixture taken in explosive—i. e., it will communicate flame from one part to another when ignited. If such temporary increase be made and the engine be turned by hand or other means to give motion to its pistons, the cylinder at C² may be made to draw a charge of highly explosive or combustible gas, which may then be fired by a suitable igniter temporarily brought into service, whereby the exploding gases, owing to their expansion, rush rapidly through the heater H and bring its mass to a high temperature, or at least sufficiently so to enable the engine to start, after which a reduction of the charge of combustible causes the engine to work without explosion of charge. A suitable igniter, electrical or otherwise, may be inserted at any point on the cylinder C², so as to fire the charge accumulated back of the piston P² at the desired point. During this firing valve E' may be kept open, so as to afford a free exit for the burned gases passing from explosion chamber or cylinder C² through the heater H for heating the same. At D is shown an electric igniter brought into action at the proper time by a circuit-closing cam M on the cam-shaft X² and whereby a current of electricity is passed at intervals through a fine wire for heating the same and exploding the charge. B is a battery or source of current in circuit with the igniter D when the cam M makes connection. The igniter D has, of course, its wires insulated from the cylinder-walls, and switch Y may be employed to open the circuit of the igniter after heater H has been heated. After this the normal cycle is permitted and the ignition and combustion of the charge is accomplished through the stored heat in H when the charge passes through it.

Fig. 2 simply shows the relation of cranks, the connecting-rods R' R² being seen to be displaced, R' being at dead-point, and R² some thirty degrees below. R² will reach the dead-point thirty degrees of revolution later than R'. R' is connected to the large piston P', and R² connected to the small piston P². This relation might be varied considerably without much affecting the result, and, as stated before, the two may be made synchronous or the crank-pins be on the same diameter.

Having described my invention, what I claim, and desire to secure by Letters Patent of the United States, is—

1. In a gas or oil engine, the combination of two cylinders, into one of which a fuel charge is indrawn and compressed, and in the other of which an air charge is indrawn and compressed, of a passage between the two lined with fire-resisting material, with spaces through the refractory material for the passage of gases, or exchange of charges between the cylinders, substantially as described.

2. In a gas or oil engine, in combination with a fuel-mixture cylinder and an air-cylinder, of a heated transfer-passage, and means for causing the transfer of the fuel charge from the fuel-cylinder to the air-cylinder, at or about the conclusion of the compression-stroke, substantially as described.

3. In a gas or oil engine, the cylinder and piston moving therein, suitable openings for indrawing a mixture of gaseous fuel and air in said cylinder; a second cylinder and piston operating synchronously or nearly synchronously with the first, and openings for admitting a charge, substantially all air to the second cylinder, a passage joining the two cylinders filled with refractory packing with interstices therethrough, the clearance in the fuel-cylinder being made less than that in the air-cylinder whereby upon compression a fuel charge is forced through the refractory packing and burned; suitable exhaust-valves and mechanism for operating the same for exhausting the gases after the power-stroke, substantially as described.

4. In a gas or oil engine, a larger cylinder, with a piston working therein, the stroke of which provides a definite clearance in said cylinder; a smaller cylinder a piston working therein, but with little or no clearance, said pistons being either simultaneously moved in synchronism or the piston of the smaller following the larger through a definite angle, as described; means such as a suitable inlet-valve, operated by proper mechanism, and fuel-passages for filling the smaller cylinder with air mixed with combustible during its intake-stroke; means for simultaneously filling the larger cylinder with air during its intake-stroke, after which, on the compression-stroke, the compression of the charges takes place, together with the transfer from the smaller to the larger cylinder through hot, refractory, material; and means for exhausting the charges from the cylinders at the conclusion of the power-stroke.

In witness whereof I have hereunder set my hand this 21st day of February, 1898.

ELIHU THOMSON.

Witnesses:
DUGALD MCKILLOP,
JOHN MCMANUS.